(12) United States Patent
Hashim

(10) Patent No.: US 9,273,441 B2
(45) Date of Patent: Mar. 1, 2016

(54) TREE NAIL

(76) Inventor: Paul R. Hashim, Bakersfield, CA (US)

( * ) Notice: Subject to any disclaimer, the term of this patent is extended or adjusted under 35 U.S.C. 154(b) by 0 days.

(21) Appl. No.: 12/000,357

(22) Filed: Dec. 12, 2007

(65) Prior Publication Data

US 2009/0151272 A1 Jun. 18, 2009

(51) Int. Cl.
*E02D 5/80* (2006.01)
*F16B 15/06* (2006.01)

(52) U.S. Cl.
CPC .. *E02D 5/80* (2013.01); *F16B 15/06* (2013.01)

(58) Field of Classification Search
CPC ....... E02D 5/80; E04H 15/62; E04H 12/2215; F16B 15/06; F16B 45/00; Y10S 411/922
USPC .......... 52/155–166, 103, 679, 698; 47/47, 44; 119/786, 788, 791; 135/118; 405/231, 405/244, 172; 248/85, 87, 156
See application file for complete search history.

(56) References Cited

U.S. PATENT DOCUMENTS

| | | | | | |
|---|---|---|---|---|---|
| 398,260 | A | * | 2/1889 | Husted | F16B 15/06 411/456 |
| D28,287 | S | * | 2/1898 | Hanline | 411/456 |
| 808,999 | A | * | 1/1906 | Luquire | 119/788 |
| 1,100,252 | A | * | 6/1914 | O'Neill | F16B 15/06 411/456 |
| 1,153,450 | A | * | 9/1915 | Schaff | E02D 5/80 411/446 |
| 1,169,821 | A | * | 2/1916 | Hindmarsh | E04H 12/2215 52/153 |
| 1,918,936 | A | * | 7/1933 | Shearman | F16B 15/06 411/456 |
| 2,007,311 | A | * | 7/1935 | Shearman | F16B 15/06 411/456 |
| 2,168,854 | A | * | 8/1939 | Agnew | F16B 15/06 411/446 |
| 2,190,883 | A | * | 2/1940 | Pauze | F16B 15/06 411/453 |
| 2,771,163 | A | * | 11/1956 | Mafera, Jr. | E02D 5/803 52/153 |
| 2,775,252 | A | * | 12/1956 | Finch | E04H 15/62 135/118 |
| 3,009,550 | A | * | 11/1961 | Deamund | E04F 10/0666 52/153 |
| 3,019,686 | A | * | 2/1962 | Behrle | B65D 9/32 411/469 |
| 3,658,037 | A | * | 4/1972 | Hunter | A01K 1/04 119/786 |
| 3,986,366 | A | * | 10/1976 | Dinsmore, Jr. | B63B 21/243 405/172 |
| 3,987,698 | A | * | 10/1976 | Rabe | F16B 15/06 411/455 |
| 4,185,424 | A | * | 1/1980 | Streit | 52/103 |
| 4,649,678 | A | * | 3/1987 | Lamson | 52/103 |
| 4,846,655 | A | * | 7/1989 | Gulley | A01G 1/08 411/453 |
| 5,040,924 | A | * | 8/1991 | Kothman | E02D 5/808 248/499 |
| 5,226,829 | A | * | 7/1993 | Jones | E04H 15/62 135/118 |
| 5,230,597 | A | * | 7/1993 | Nuttall | E04H 17/10 411/453 |

(Continued)

*Primary Examiner* — James Ference
(74) *Attorney, Agent, or Firm* — Ralph D. Chabot

(57) ABSTRACT

An improved anchor device that is capable of simultaneously securing a plurality of items while extended into the ground. The anchor device comprises a central cylindrical rod with a flanged nail head at the top for driving the apparatus into the ground and a tapered pointed end at the bottom for easy penetration into the ground. A plurality of cylindrical shaped barbs extending out from said cylindrical rod with a flanged half circle nail head at the end of each barb formed about the central cylindrical rod, extended outward and upward at an angle, oriented around the lower portion of the central cylindrical rod, spaced equally in circular, spiral, descending order for maximum extraction resistance. Cylindrical U shaped loops offset from each other and formed on opposite sides of central cylindrical rod placed under the flanged nail head for securing or anchoring objects attached to the anchor device.

2 Claims, 1 Drawing Sheet

(56) References Cited

U.S. PATENT DOCUMENTS

| | | | | |
|---|---|---|---|---|
| 5,291,703 A * | 3/1994 | Ziegler | | 52/103 |
| 5,463,834 A * | 11/1995 | Krieger | | E04H 15/62 135/118 |
| 5,623,843 A * | 4/1997 | Sands | | B62H 3/00 248/499 |
| 5,832,672 A * | 11/1998 | Griffiths | | E04H 15/62 135/115 |
| 5,975,808 A * | 11/1999 | Fujita | | E02D 5/28 405/244 |
| D418,400 S * | 1/2000 | Juska | | D8/391 |
| 6,256,942 B1 * | 7/2001 | Schatz | | 52/155 |
| 6,349,514 B1 * | 2/2002 | Adams | | A01G 9/122 135/118 |
| 6,514,013 B2 * | 2/2003 | Li | | E21D 21/0026 405/259.1 |
| 2004/0202512 A1 * | 10/2004 | Smith | | 405/259.1 |
| 2005/0091746 A1 * | 5/2005 | Clouston | | E04H 15/62 5/417 |

\* cited by examiner

TREE NAIL

BACKGROUND OF THE INVENTION

1. Field of Invention

The history of the present invention relates generally to stakes driven into the ground, to serve as a survey monument, marking stakes or a stake system to be utilized within various soil conditions. More specifically, these devices were designed for the particular purpose they address.

2. Discussion of the Prior Art

Typically anchor devices such as stakes have been used for years. These devices usually consist of a shaft having a flanged upper end and a pointed lower end. The user drives the stake into the ground with a hammer. The user ties a rope to the upper end of the stake and then ties the other end of the rope to an object to be secured.

However, some stakes work fine for whatever purpose they are designed for. Other stakes were designed to work with different soil types and are not able to maintain their resistive extraction capabilities during extreme wind and seismic conditions.

For instance, in conditions when the stake device was driven into the ground, and a constant force was being applied to the stake, the resistive forces of the anchoring system were often weakened.

Although the various designs of stakes were created for the purpose they were designed for they may not be suitable to provide the extraction resistance necessary to prevent weakening or removal of the stake for all conditions.

SUMMARY OF THE INVENTION

In view of the design of the known types of stake devices of the prior art, the few-present invention provides a unique extraction resistance anchoring system construction that can be utilized and adapted to all conditions.

The general purpose of the design of the present invention is to provide a new extraction resistance anchoring system that has advantages over existing stake designs anchoring systems. To attain this, the unique placement of the cylindrical shaped barb with flanged half circle nail head placed around the lower portion of the central cylindrical shaped rod allows for easy penetration into the ground but provides a strong extraction resistance force from uplifting.

The present invention comprises a central cylindrical shaped rod with a flanged nail head and a tapered end with two U shaped loops located under the flanged nail head and a unique anchoring system consisting of a plurality of cylindrical shaped barbs each having a respective flanged half circle nail head extending outward and upward at an angle from the central cylindrical shaped rod.

It is understood that the present invention is not limited in its application to the details of construction and to the arrangements of components set forth in the following description or illustrated in the drawings.

In closing, the anchoring system according to the present invention differs from the current designs of the prior art in the extraction resistance design. The present invention provides an apparatus primarily designed with an improved unique extraction resistance anchoring system with utilization and adaptation in all conditions.

DESCRIPTION OF THE PREFERRED EMBODIMENTS

Figure 1:
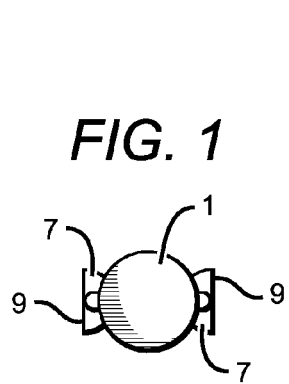
FIG. 1 is a top view of the preferred embodiment of the present invention, showing the details thereof.
Figure 2:
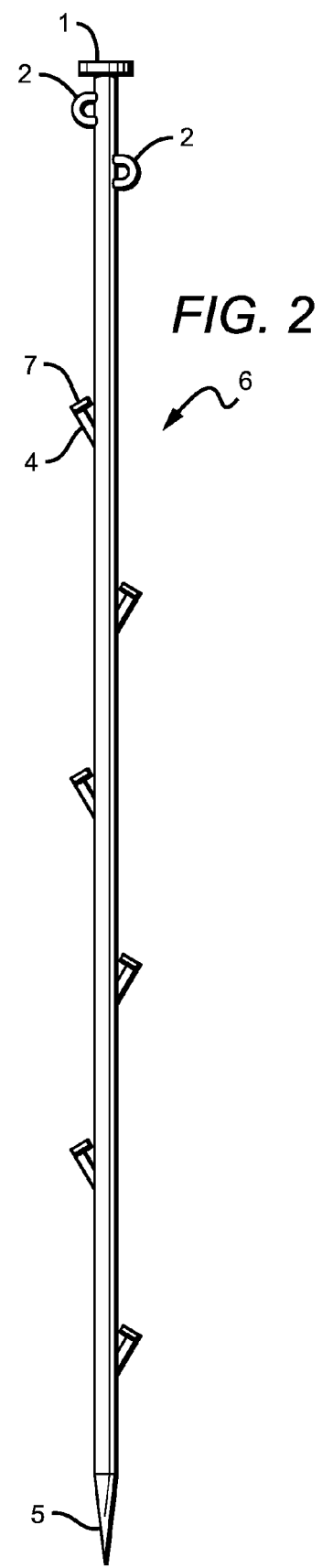
FIG. 2 is a front view of the preferred embodiment of the present invention, showing the details thereof.
Figure 3:
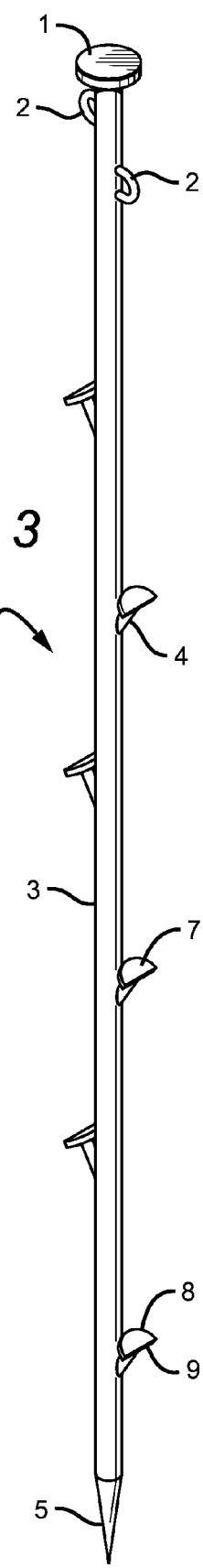
FIG. 3 is an isometric view of the preferred embodiment of the present invention, showing the details thereof.

The details of the preferred embodiment of the present invention are shown in FIGS. 1-3. Turning to FIG. 3; stake 6, generally comprises a steel cylindrical rod 3, a plurality of steel cylindrical barbs 4 each having a flanged half circle top 7, a steel flanged nail head 1, steel U shape tethering loops 2 and a tapered grooved end 5. Each half circle top 7 has a circular circumference edge 8 and a diameter edge 9. Each circular circumference edge 8 faces toward rod 3 and each diameter edge faces away from rod 3.

Stake 6 can be constructed in a variety of sizes of which by way of example, three are provided as follows.

Overall Length 48 Inches.

Diameter of steel rod 3 is 0.625 inch. Nail head 1 is 1.625 inch diameter and 0.25 inches thick. Located on stake 6 approximately 1 inch below the top surface of nail head 1 is the first of a pair of 0.5 inch diameter loops 2. The second loop is offset the first and located 1 inch below the first loop. Each of loops 2 are integral with stake 6. Located 12 inches below the top surface of nail head 1 is the first of a plurality of barbs 4, 0.25 inches in diameter which extends away from rod 3 and at an acute angle toward nail head 1 as shown best in FIG. 2. Spacing between each barb can be about 6 inches and are staggered about the circumference of stake 6. Located at the distal end of each barb 4 is a 0.5 inch half circle top. The half-circle is orientated so that the circumferential edge 8 faces toward rod 3. The diameter edge of top 7 is positioned to be the furthest point of barb 4 away from rod 3 and is 0.625 inches from the surface of rod 3, facing away. Stake 6 has a 2 inch taper to a pointed distal end 5.

Overall Length 60 Inches.

Diameter of steel rod 3 is 0.75 inch. Nail head 1 is 1.75 inch diameter and 5/16 inches thick. Located on stake 6 approximately 2 inches below the top surface of nail head 1 is the first of a pair of 0.75 inch diameter loops 2. The second loop is offset the first and located 2 inches below the first loop. Each of loops 2 are integral with stake 6. Located 18 inches below the top surface of nail head 1 is the first of a plurality of barbs 4, 5/16 inches in diameter which extends away from rod 3 and at an acute angle toward nail head 1 as shown best in FIG. 2. Spacing between each barb can be about 8.5 inches or 12 inches and are staggered about the circumference of stake 6. Located at the distal end of each barb 4 is a 0.5 inch half circle top. The half-circle is orientated so that the circumferential edge 8 faces toward rod 3. The diameter edge of top 7 is positioned to be the furthest point of barb 4 away from rod 3 and is 0.75 inches from the surface of rod 3, facing away. Stake 6 has a 3 inch taper to a pointed distal end 5.

Overall Length 72 Inches.

Diameter of steel rod 3 is 1.0 inch. Nail head 1 is 2.0 inch diameter and 0.375 inches thick. Located on stake 6 approximately 3 inches below the top surface of nail head 1 is the first of a pair of 1.0 inch diameter loops 2. The second loop is offset the first and located 3 inches below the first loop. Each of loops 2 are integral with stake 6. Located 24 inches below the top surface of nail head 1 is the first of a plurality of barbs 4, 0.375 inches in diameter which extends away from rod 3 and at an acute angle toward nail head 1 as shown best in FIG. 2. Spacing between each barb can be about 9.0 inches or 18 inches and are staggered about the circumference of stake 6.

Located at the distal end of each barb 4 is a 0.5 inch half circle top. The half-circle is orientated so that the circumferential edge 8 faces toward rod 3. The diameter edge of top 7 is positioned to be the furthest point of barb 4 away from rod 3 and is 0.875 inches from the surface of rod 3, facing away. Stake 6 has a 4 inch taper to a pointed distal end 5.

I claim:

1. A tethering stake comprising:
   a. a rod with a predetermined diameter and having a circular flanged flat surface head said rod having a predetermined length and a tapered end opposite of said head;
   b. a plurality of nail like barbs each having a predetermined diameter and extending away from said rod at a respective acute angle toward said head, each of said barbs having a distal flat surface top in a semi-circle configuration having a circular circumference edge and a diameter edge, said circular circumference edge of said top facing toward said rod and said diameter edge facing away from said rod; and
   c. a pair of U shaped loops each having a predetermined diameter, each of said loops integral with said rod offset from one another and located below said rod head and above said barbs.

2. The tethering stake of claim 1, wherein the tethering stake is constructed of metal.

* * * * *